(12) United States Patent
Pannell (10) Patent No.: US 11,038,713 B2
(45) Date of Patent: Jun. 15, 2021

(54) COMMUNICATIONS DEVICE AND METHOD FOR COMMUNICATIONS

(71) Applicant: NXP B.V., Eindhoven (NL)

(72) Inventor: Donald Robert Pannell, Cupertino, CA (US)

(73) Assignee: NXP B.V., Eindhoven (NL)

( * ) Notice: Subject to any disclaimer, the term of this patent is extended or adjusted under 35 U.S.C. 154(b) by 71 days.

(21) Appl. No.: 16/581,649

(22) Filed: Sep. 24, 2019

(65) Prior Publication Data

US 2020/0106639 A1    Apr. 2, 2020

Related U.S. Application Data

(60) Provisional application No. 62/740,416, filed on Oct. 2, 2018.

(51) Int. Cl.
*H04L 12/40* (2006.01)
*H04L 29/08* (2006.01)
*H04L 12/413* (2006.01)

(52) U.S. Cl.
CPC ...... *H04L 12/40136* (2013.01); *H04L 12/413* (2013.01); *H04L 69/323* (2013.01); *H04L 2012/40273* (2013.01)

(58) Field of Classification Search
CPC ....... H04L 47/10; H04L 47/12; H04L 47/263; H04L 47/25; H04L 47/22; H04L 47/225; H04L 47/6255; H04L 47/626; H04L 1/0002; H04L 43/0894; H04L 1/0015; H04L 12/40136; H04L 69/321; H04L 12/413; H04L 69/323; H04L 2012/40273
See application file for complete search history.

(56) References Cited

U.S. PATENT DOCUMENTS

| | | | |
|---|---|---|---|
| 7,356,047 B1 * | 4/2008 | Mahalawat | H04J 3/0688 370/395.5 |
| 8,125,924 B2 * | 2/2012 | Balb | H04L 29/06 370/253 |
| 8,553,720 B2 * | 10/2013 | Bishara | G06F 5/065 370/469 |
| 9,130,695 B1 * | 9/2015 | Dalmia | H04L 1/0006 |
| 2002/0150107 A1 * | 10/2002 | Aronson | H04L 12/4625 370/395.53 |
| 2005/0188232 A1 * | 8/2005 | Weng | G06F 1/3203 713/320 |
| 2005/0201415 A1 * | 9/2005 | Narsinh | H04L 49/354 370/469 |
| 2006/0109784 A1 * | 5/2006 | Weller | H04L 12/4013 370/229 |
| 2009/0154473 A1 * | 6/2009 | Diab | H04L 47/22 370/400 |
| 2010/0111081 A1 * | 5/2010 | Diab | G06F 1/3234 370/389 |

(Continued)

*Primary Examiner* — Wutchung Chu
(74) *Attorney, Agent, or Firm* — Rajeev Madnawat (57) ABSTRACT

Embodiments of a device and method are disclosed. In an embodiment, a method of communications involves operating an Ethernet media access control (MAC) unit according to a rate specified in an IEEE 802.3 standard and adapting to transmit data to or from the Ethernet MAC unit at an effective data communications rate on a physical media, where the effective data communications rate is different from the rate specified by the IEEE 802.3 standard.

16 Claims, 9 Drawing Sheets

(56) References Cited

U.S. PATENT DOCUMENTS

| | | | |
|---|---|---|---|
| 2010/0322105 A1* | 12/2010 | Diab | H04L 12/40136 |
| | | | 370/254 |
| 2013/0343400 A1* | 12/2013 | Lusted | H04L 12/413 |
| | | | 370/419 |
| 2016/0365967 A1* | 12/2016 | Tu | H04L 12/413 |
| 2018/0034740 A1* | 2/2018 | Beliveau | H04L 47/28 |
| 2019/0342199 A1* | 11/2019 | Hurson | H04L 67/1097 |

\* cited by examiner

COMMUNICATIONS DEVICE AND METHOD FOR COMMUNICATIONS

CROSS-REFERENCE TO RELATED APPLICATIONS

Summary

The current application claims priority to U.S. Provisional Patent application Ser. No. 62/740,416, filed Oct. 2, 2018, entitled "IEEE 802.3cg with Faster Speeds," which is incorporated by reference herein.

BACKGROUND

Ethernet is a well-known network technology and the Institute of Electrical and Electronic Engineers (IEEE) 802.3 Working Group is a collection of standards that define physical layer and data link layer media access control (MAC) for wired Ethernet. For example, modern automobiles include various electronic control units (ECUs) that communicate with each other in an automobile via in-vehicle network (IVN) technologies such as Ethernet. An emerging IEEE standard that may be particularly applicable to in-vehicle networks is IEEE 802.3cg, which is a specification for 10 Megabits per second (Mb/s) over single twisted-pair Ethernet that enables multiple nodes to connect to the same twisted-pair, also referred to as a "shared media." Being able to connect slower devices (those less than 100 Mb/s) in a cost-effective way is a motivation that drives the start of the IEEE 802.3cg (10BASE-T1) project. Connecting Ethernet to Ethernet of different speeds using a switch may be easy, and all the benefits of Ethernet, e.g., the IEEE 802.1's Time Sensitive Network (TSN) capabilities, lower latency and security can be retained. However, as more and more applications run on top of a shared media, the limit of a designated data rate (e.g., 10 Mb/s for IEEE 802.3cg) can limit or reduce the applications that can be supported.

SUMMARY

Embodiments of a device and method are disclosed. In an embodiment, a method of communications involves operating an Ethernet media access control (MAC) unit according to a rate specified in an IEEE 802.3 standard and adapting to transmit data to or from the Ethernet MAC unit at an effective data communications rate on a physical media, where the effective data communications rate is different from the rate specified by the IEEE 802.3 standard.

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Figure 1:
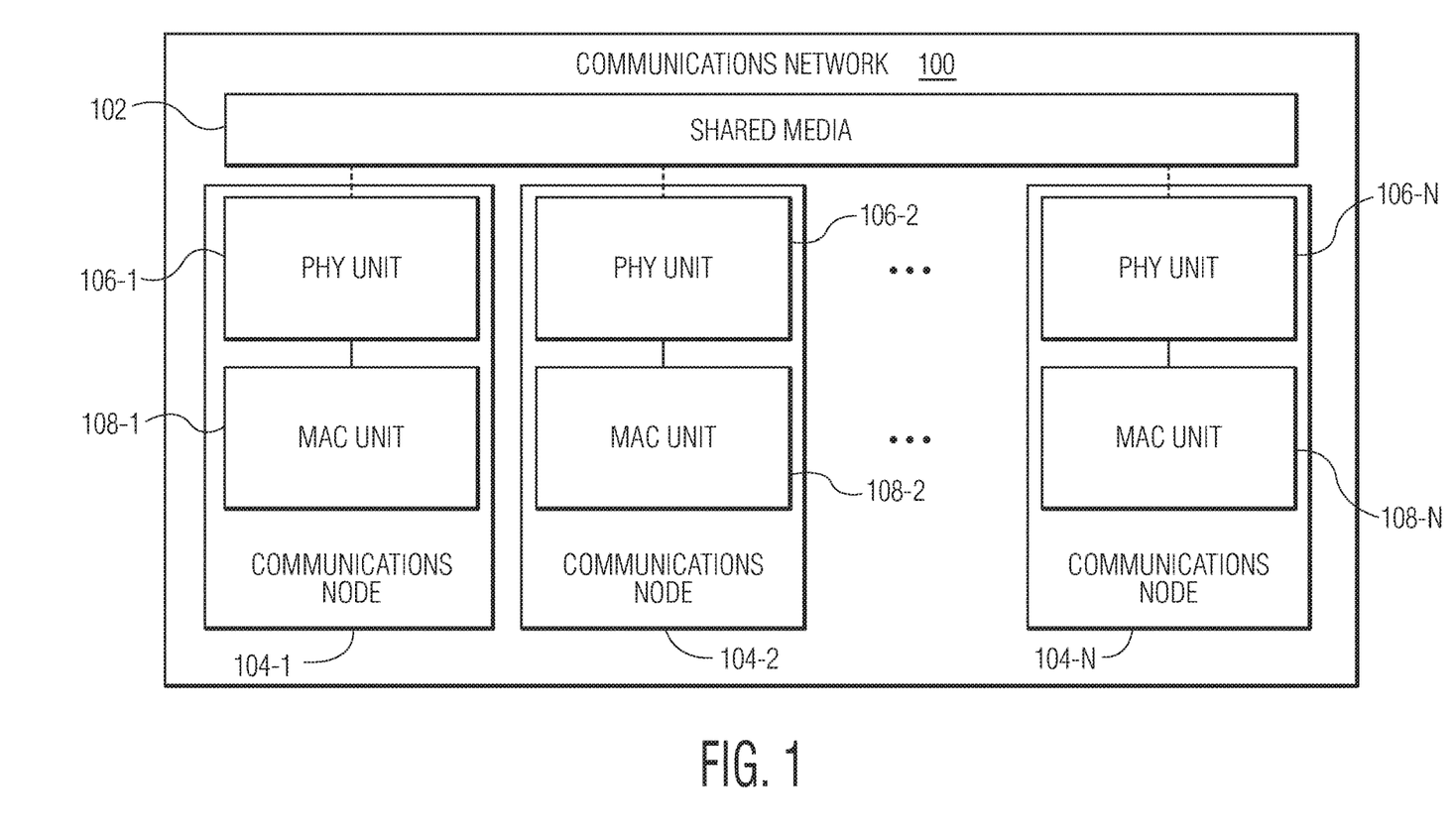
FIG. 1 depicts a communications network that includes multiple communications nodes.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment. FIG. 1 depicts a communications network 100 that includes multiple communications nodes 104-1, 104-2, . . . , 104-N (where N is an integer greater than one). In the embodiment of FIG. 1, each communications node includes a corresponding physical layer (PHY) unit 106-1, 106-2, . . . , or 106-N (also referred to as a transceiver) and a corresponding media access control (MAC) unit 108-1, 108-2, . . . , or 108-N configured to perform media access arbitration to orchestrate media access. In an embodiment, the communications nodes may be end nodes that include, for example, various electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. In some embodiments, the communications network is an Ethernet network that utilizes Carrier Sense Multiple Access/Collision Detection (CSMA/CD) for media access control. In these embodiments, the communications network may be at least partially compatible with an IEEE standard (e.g., the emerging IEEE 802.3cg protocol that specifies a 10 Mb/s single twisted-pair wired communications protocol). The communications nodes may also be a node such as an Ethernet bridge. Although the illustrated communications nodes are shown with certain components and described with certain functionality herein, other embodiments of the communications nodes may include fewer or more components to implement the same, less, or more functionality. For example, although the illustrated communications nodes 104-1, 104-2, . . . , 104-N are shown in FIG. 1 as connected to and communicating through a shared media 102 (e.g., twisted-pair wires or other physical media), in some embodiments, at least one of the communications nodes communicates with a counterpart communications node through a point-to-point connection or link.

In the embodiment of FIG. 1, the PHY units 106-1, 106-2, . . . , 106-N are configured to manage physical layer communications functions of the corresponding communications nodes 104-1, 104-2, . . . , 104-N. For example, each PHY unit transmits one or more analog signals onto a physical media (e.g., the shared media 102 or a point-to-point media) and receives one or more analog signals from a physical media (e.g., the shared media or a point-to-point media). The PHY units may also protect other components in the corresponding communications nodes 104-1, 104-2, . . . , 104-N from extreme electrical conditions, e.g., electrical surges, which may occur on the shared media. In some embodiments, the PHY units are configured to manage physical layer communications functions at least partially according to an IEEE standard (e.g., IEEE 802.3cg protocol).

In the embodiment of FIG. 1, the MAC units 108-1, 108-2, . . . , 108-N are configured to perform media access control for the corresponding communications nodes 104-1, 104-2, . . . , 104-N. At least one of the MAC units may be implemented within a processor, such as a microcontroller, a host processor, a host, a digital signal processor (DSP), or a central processing unit (CPU). In some embodiments, at least one of the MAC units is included within the PHY layer module of an Ethernet communications device. For example, at least one of the MAC units is included within the PHY layer module of an Ethernet communications device that is at least partially compatible with an IEEE standard (e.g., IEEE 802.3cg protocol). Although the illustrated MAC units are shown in FIG. 1 as included in the corresponding communications nodes, in some embodiments, the MAC units may be separated from the corresponding communications nodes.

Figure 2:
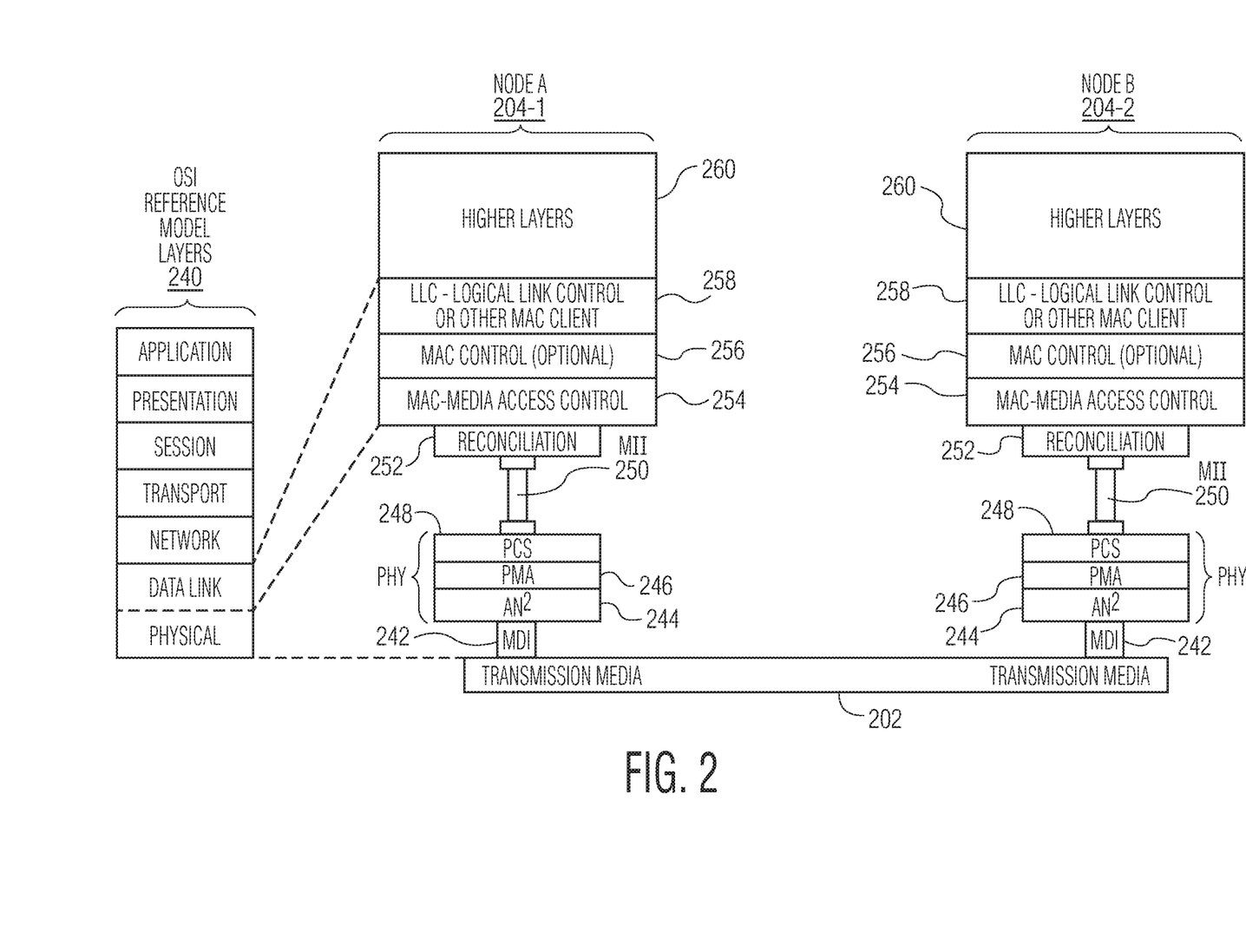
FIG. 2 illustrates an Ethernet communication network and the Open Systems Interconnection (OSI) reference model.

FIG. 2 illustrates an Ethernet communication network that includes two nodes, node A 204-1 and node B 204-2. The node A 204-1 and the node B 204-2 depicted in FIG. 2 are possible embodiments of the communications nodes 104-1, 104-2, . . . , 104-N depicted in FIG. 1. However, the communications nodes 104-1, 104-2, . . . , 104-N depicted in FIG. 1 are not limited to the node A 204-1 and the node B 204-2 depicted in FIG. 2. The node A 204-1 and the node B 204-2 can be used in an Ethernet based network that is, for example, compatible with an IEEE standard (e.g., IEEE 802.3cg protocol). FIG. 2 also depicts the layers of the OSI reference model 240 as well as an expanded view of the physical layer and the data link layer. As shown in FIG. 2, the OSI reference model includes the physical layer (also referred to as layer 1 or L1), the data link layer (also referred to as layer 2 or L2), the network layer (also referred to as layer 3 or L3), the transport layer (also referred to as layer 4 or L4), the session layer (also referred to as layer 5 or L5), the presentation layer (also referred to as layer 6 or L6), and the application layer (also referred to as layer 7 or L7). Elements in the expanded view of the physical layer include media-dependent sublayers of as transmission media 202, a media-dependent interface (MDI) 242, an auto-negotiation layer (AN2) 244, a physical medium attachment (PMA) 246, and a physical coding sublayer (PCS) 248, and media-independent sublayers of a media-independent interface (MII) 250, and a reconciliation sublayer 252. In an embodiment, elements of the PCS, PMA, and AN2 are included in a physical layer chip, often referred to as a "PHY chip" and or simply as a "PHY" as indicated in FIG. 2. Elements in the expanded view of the data link layer include a media access control (MAC) layer 254, an optional MAC control layer 256, and a logical link control (LLC) 258, or other MAC client layer. Higher layers 260 may be implemented above the data link layer.

Under current IEEE 802.3 PHY specifications, MAC, PHY and Media are all specified to operate at the same data rate or speed. In other words, under current IEEE 802.3 PHY specifications, a PHY device can't transmit data on a physical media at a different data rate than the data rate of a MAC unit to which the PHY device is connected to. In addition, IEEE 802.3cg is a PHY-only project, meaning that changing MAC in any way is out of scope of the project. For example, the IEEE 802.3cg standard project defines a 10 Mb/s PHY that works on single unshielded twisted-pair cables. In addition, the IEEE 802.3cg standard project also defines a point-to-point mode of operation and a multi-drop mode of operation where multiple end-node or bridges are connected to a single twisted-pair wire network segment. In Ethernet terms, when the point-to-point mode is used the network is known as a full-duplex network segment or link and when the multi-drop mode is used the network is known as a half-duplex network segment or link. Per the Scope of the IEEE 802.3cg project, it may not define a new Ethernet MAC. Consequently, the standard CSMA/CD MAC can be used, which can support both full-duplex & half-duplex modes of operation. When PHYs are standardized in IEEE 802.3 they may not contain any buffers for Ethernet frames. Consequently, PHYs as defined in IEEE 802.3 standards can be viewed as sophisticated I/O pads since their job is to connect the Ethernet MAC to the target physical medium without modifying the "data." MACs and PHYs are designed to work at the single specified data rate as defined in the IEEE 802.3 standards (e.g., 10 Mb/s in the IEEE 802.3cg), which means that the MAC on one side of a link sends the Ethernet frame information to its local PHY where that data is transmitted on the medium with a very short fixed latency (with some allowed jitter that is short as compared to the frame's transmission time). IEEE 802.3 has not created new MACs other than full-duplex MACs at new (typically higher) speeds, which means the 802.3cg project's half-duplex MAC options for the multi-drop mode is limited to either the 10 Mb/s CSMA/CD MAC, or the 100 Mb/s CSMA/CD MAC. Since the PHY is targeted at 10 Mb/s, the 10 Mb/s CSMA/CD MAC may be chosen. However, PHYs that can be purchased typically go beyond what is specified by IEEE standards. For example, PHYs as defined in the IEEE standards are models & interface specifications so that PHYs from different vendors can interoperate "on the wire." An actual PHY product from a vendor may incorporate more than just one standard. For example, a typical Enterprise 10/100/1000 Mb/s PHY incorporates 3 separate IEEE PHY standards. Adding Energy Efficient Ethernet to product adds one or more IEEE standards. Applications are emerging where the 10 Mb/s data rate/speed of the IEEE 802.3cg standard is not quite enough. For those applications, an option available to the Automotive market is to use 100 Mb/s point-to-point links. However, the lower cost of the multi-drop mode's shared media can be more suitable for various applications. For example, a typical example use case where the 10 Mb/s is not enough is an application that uses multiple Audio Video Bridging (AVB) audio streams on one shared link. These applications may need link speeds in the 20 to 25 Mb/s of bandwidth range. Due to the needs of greater than 10 Mb/s speeds, there has been interests at a 100 Mb/s multi-drop PHY project. However, as speeds go up in shared media environments, the "reach" or length of a physical network necessarily needs to be scaled back or a much more expensive PHY needs to be developed. Either of these reasons can prevent a 100 Mb/s multi-drop project from starting. Another reason for IEEE 802.3 to focus on PHY-only projects is the expectation that these new PHYs can work with existing SoCs. Many SoCs do not integrate Ethernet PHYs but supply an MII interface to connect to one externally.

Figure 3:
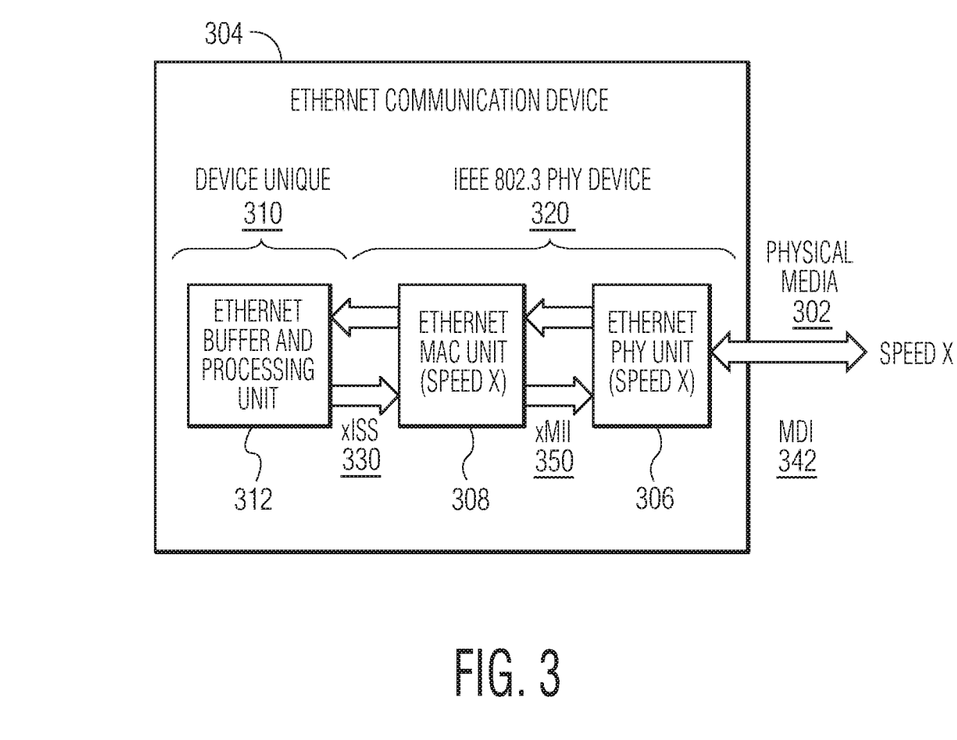
FIG. 3 illustrates a MAC to PHY to Media operation that can be performed by an Ethernet communication device.

FIG. 3 illustrates a MAC to PHY to Media operation that can be performed by an Ethernet communication device 304, for example, according to the IEEE 802.3cg standard. As illustrated in FIG. 3, the Ethernet communication device 304 includes a unique device 310 (e.g., a system on a chip (SoC) or a switch), which includes an Ethernet buffer and processing unit 312, and an IEEE 802.3 PHY device 320, which includes an Ethernet MAC unit 308 and an Ethernet PHY unit 306. The Ethernet buffer and processing unit of the unique device communicates with the Ethernet MAC unit of the IEEE 802.3 PHY device through an Internal Sublayer Service (ISS) 330. The Ethernet MAC unit communicates with the Ethernet PHY unit at a data rate or speed, "X," through a media-independent interface or an MII 350 (e.g., reduced media-independent interface (RMII), gigabit media-independent interface (GMII), reduced gigabit media-independent interface (RGMII), 10-gigabit media-independent interface (XGMII) and serial gigabit media-independent interface (SGMII), etc., referred to collectively as "xMII"), which in turn transmit data to a physical media 302 or receive data from a physical media at the data rate, X, through a media-dependent interface (MDI) 342. In some embodiments, the Ethernet buffer and processing unit and the Ethernet MAC unit are included in a system on a chip (SoC) because having a standard interface allows a PHY to be used on many different SoCs and an SoC can be used many different PHYs.

Figure 4:
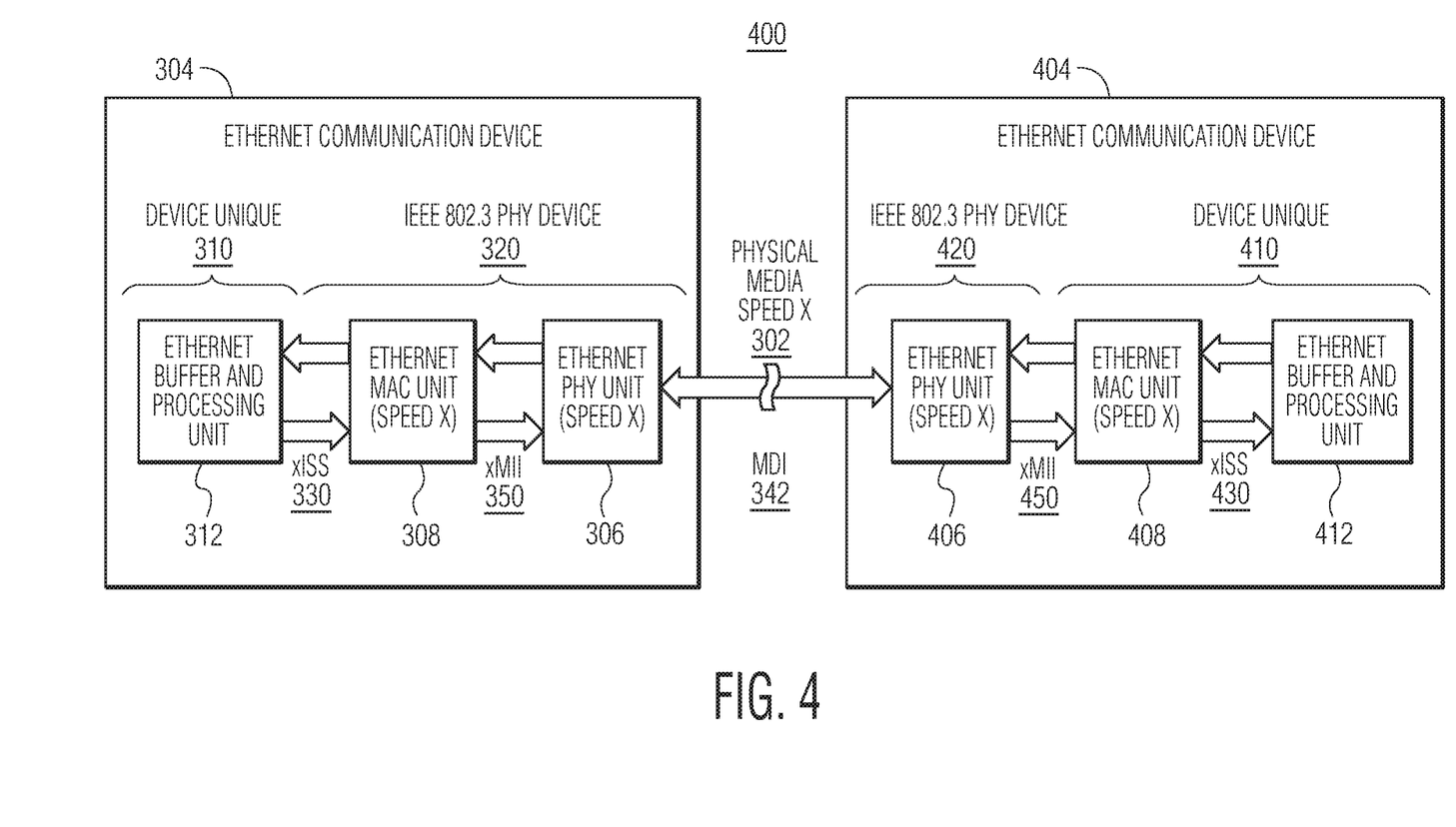
FIG. 4 illustrates a MAC to PHY to Media to PHY to MAC operation that can be performed by an Ethernet communication network.

FIG. 4 illustrates a MAC to PHY to Media to PHY to MAC operation that can be performed by an Ethernet communication network 400, for example, according to the IEEE 802.3cg standard. In addition to the MAC to PHY to Media operation by the Ethernet communications device 304 illustrated in FIG. 3, the operation illustrated in FIG. 4 includes recovery operation that is performed by a counterpart Ethernet communications device 404 to transmit data unchanged to a local MAC unit 408, for example, with a short fixed latency and with some jitter. As illustrated in FIG. 4, an Ethernet PHY unit 406 of an IEEE 802.3 PHY device 420 transmit data to the physical media 302 or receive data from the physical media at a data rate or speed, X, through the MDI 342. The Ethernet PHY unit 406 communicates with the Ethernet MAC unit 408 at the data rate, X, through an MII 450. The Ethernet MAC unit 408 communicates with an Ethernet buffer and processing unit 412 of a unique device 410 (e.g., a SoC or a switch) through an ISS 430.

Figure 5:
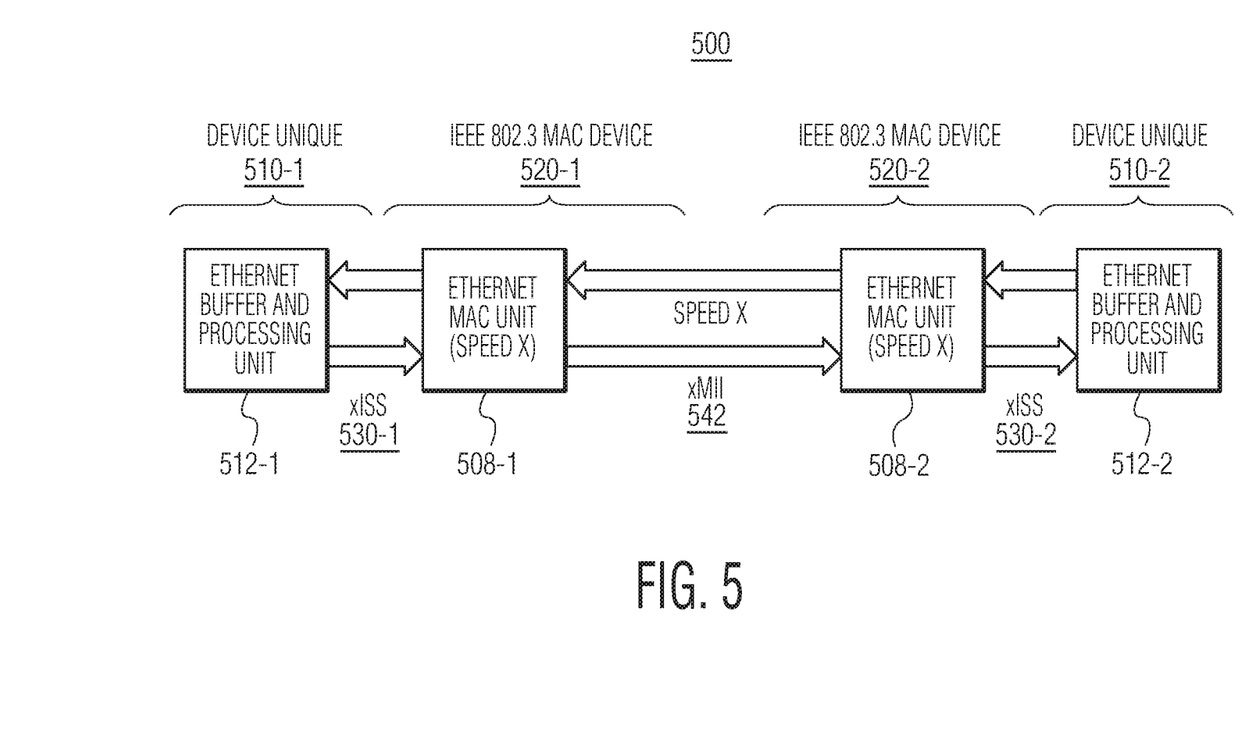
FIG. 5 illustrates a MAC to MAC operation that can be performed by an Ethernet communication network.

In some cases, PHY devices can be removed from a communications link and two MAC units can directly communicate with each other. FIG. 5 illustrates a MAC to MAC operation that can be performed by an Ethernet communication network 500. In the embodiment depicted in FIG. 5, data exchange at data rate, X, between two Ethernet MAC units 508-1, 508-2 within IEEE 802.3 MAC devices 520-1, 520-2 works without PHYs. For example, depending upon the xMII interface variant 542 that is used, the Ethernet MAC unit on one side of the link transmits MII clock signals to mimic what a PHY unit behaves, which is well known in the industry. An Ethernet buffer and processing unit 512-1 of a unique device 510-1 (e.g., a SoC or a switch) communicates with the Ethernet MAC unit 508-1 through an ISS 530-1. An Ethernet buffer and processing unit 512-2 of a unique device 510-2 (e.g., a SoC or a switch) communicates with the Ethernet MAC unit 508-2 through an ISS 530-2. Direct MAC to MAC connections are typically used inside a communications device between an SoC device and a switch device and are short reach links (typically inches). Direct MAC to MAC connections are illustrated here to show that the when PHYs are used in the communications link, the PHYs don't change the data.

In accordance with an embodiment of the invention, a method of communications involves operating an Ethernet MAC unit according to a rate specified in an IEEE 802.3 standard and adapting to transmit data to or from the Ethernet MAC unit at an effective data communications rate on a physical media that is different from the IEEE 802.3 standard. In some embodiments, the effective data communications rate is defined as the actual data communications rate at which data is transferred on the physical media. By adapting to transmit data to or from the Ethernet MAC unit at an effective data communications rate that may be different from a rate specified by an IEEE 802.3 standard, the data communications rate on the physical media can be set to an appropriate value for various applications. Consequently, an Ethernet communications device can communicate on a physical media at a data rate that is different from the data rate specified by an IEEE 802.3 standard. In some embodiments, an Ethernet communications device communicates on a physical media at a data rate that is lower than the data rate specified by an IEEE 802.3 standard. For example, an Ethernet communications device can communicate on a physical media at a data rate that is lower than 100 Mb/s but is higher than 10 Mb/s, which allows for cost effective solutions for applications that don't require the full data rate.

Figure 6:
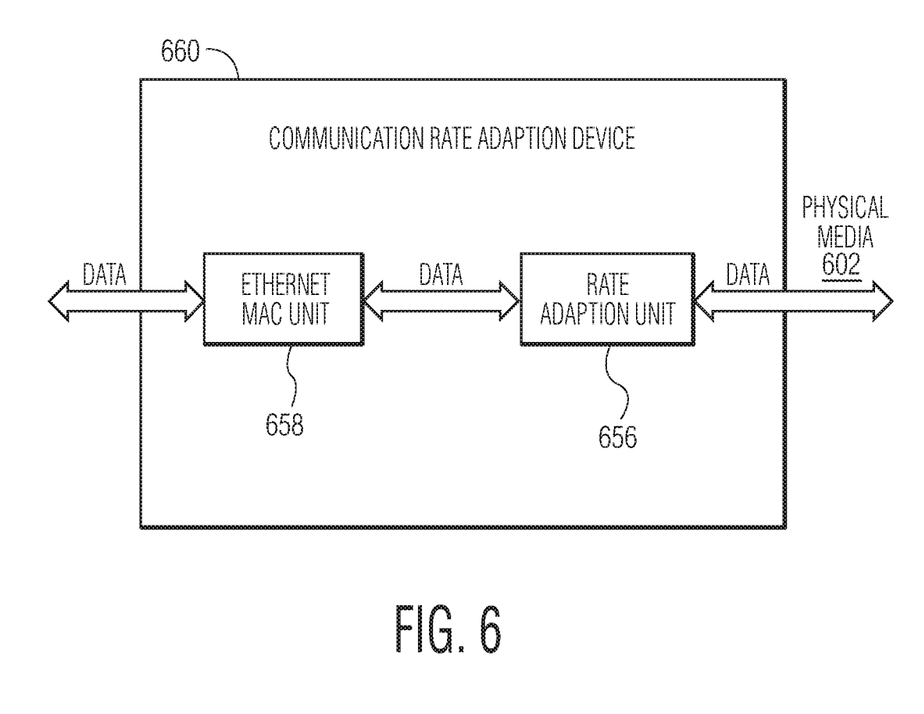
FIG. 6 depicts a communications rate adaption device in accordance with an embodiment of the invention.

FIG. 6 depicts a communications rate adaption device 660 in accordance with an embodiment of the invention. In the embodiment depicted in FIG. 6, the communications rate adaption device includes an Ethernet MAC unit 658 configured to perform media access control for a corresponding Ethernet communications device and a rate adaption unit 656 configured to adapt to transmit data to or from the Ethernet MAC unit at a separate data communications rate. At least one of the Ethernet MAC unit and the rate adaption unit may be implemented within a processor, such as a microcontroller, a host processor, a host, a DSP, or a CPU. In some embodiments, at least one of the Ethernet MAC unit and the rate adaption unit is included within the PHY layer module of an Ethernet communications device. Although the illustrated communications nodes are shown with certain components and described with certain functionality herein, other embodiments of the communications nodes may include fewer or more components to implement the same, less, or more functionality. For example, although the illustrated communications rate adaption device is shown in FIG. 6 as including one Ethernet MAC unit, in some embodiments, the communications rate adaption device may include multiple Ethernet MAC units, for example, multiple Ethernet MAC units that operate according to different IEEE standards.

In the embodiment depicted in FIG. 6, the Ethernet MAC unit 658 is operable according to a rate specified in an IEEE 802.3 standard. In some embodiments, the Ethernet MAC unit is operable according to a rate specified in IEEE 802.3 standards as of the end of 2019. However, the Ethernet MAC unit may be operable according to a rate specified in a previous version of IEEE 802.3 standards, a current version of IEEE 802.3 standards, or a future version of IEEE 802.3 standards. The rate adaption unit 656 is configured to adapt to transmit data to or from the Ethernet MAC unit at an effective data communications rate on a physical media 602, where the effective data communications rate is different from the rate specified by the IEEE 802.3 standards as of the end of 2019. In some embodiments, the effective data communications rate is defined as the actual data communications rate at which data is transferred on the physical media. In some embodiments, the effective data communications rate is lower than the rate specified by the IEEE 802.3 standard. In an embodiment, the rate specified by the IEEE 802.3 standard is 100 Megabits per second (Mb/s), and the effective data communications rate is between 10 Mb/s and 100 Mb/s. In an embodiment, the effective data communications rate is a non-standard Ethernet data communications rate.

Figure 7:
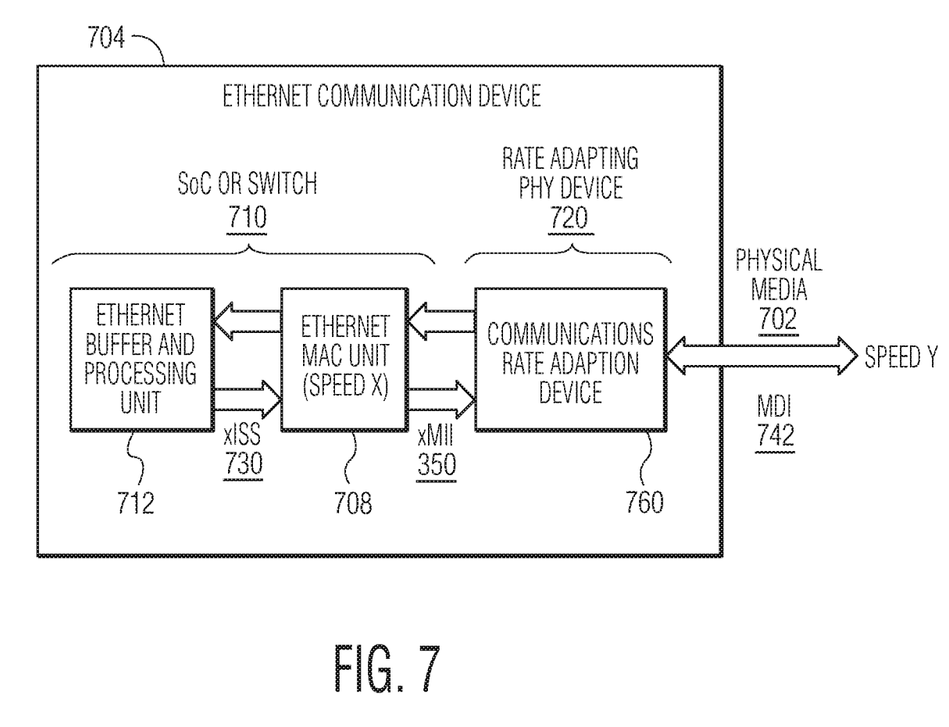
FIG. 7 depicts an embodiment of an Ethernet communications device that includes a communications rate adaption device.

FIG. 7 depicts an embodiment of an Ethernet communications device 704 that includes a communications rate adaption device 760. In the embodiment depicted in FIG. 7, the Ethernet communications device 704 includes an Ethernet buffer and processing unit 712, an Ethernet MAC unit 708, and the communications rate adaption device 760. The Ethernet buffer and processing unit and the Ethernet MAC unit may be included in a SoC or a switch 710. The communications rate adaption device can be integrated in a rate adapting PHY device 720 that is connected to a SoC using an industry & IEEE standard MII interface. For example, the communications rate adaption device may be integrated in a rate adapting multi-drop PHY device that operates at 10 Mb/s for compatibility to other 10 Mb/sec PHYs that may be on the same shared media, and faster, up to 100 Mb/s. In some applications, a data rate of more than 10 Mb/s, but far less than 100 Mb/s is needed. The possible need to reduce the cost and the size/reach of an Ethernet network (e.g., a shared media's cable length) in exchange for the expanded data rate can be attractive to the automotive market considering the alternatives. For example, at 25 Mb/s, it may be acceptable to reduce the size/reach of the network by 2.5 times, as this is still a 10 meter reach, which is close to Automotive PHY standard reach of 15 meters.

The data communications rate at which the communications rate adaption device can be adapted is not limited to 10 Mb/s, 100 Mb/s or any value that is between 10 Mb/s and 100 Mb/s. In some embodiments, the functionality of the communications rate adaption device is implemented in hardware (e.g., circuits), software, firmware, or a combination thereof.

In the embodiment depicted in FIG. 7, the Ethernet buffer and processing unit 712 communicates with the Ethernet MAC unit 708 through an Internal Sublayer Service (ISS) 730. The Ethernet MAC unit, which operated according to a data rate, X, specified in an IEEE 802.3 standard, communicates with the communications rate adaption device 760 through an MII 750. The communications rate adaption device adapts to transmit data to or from the Ethernet MAC unit at an effective data communications rate, "Y," on a physical media 702 through an MDI 742. The effective data communications rate, Y, may be different from the rate, X, specified by an IEEE 802.3 standard. In some embodiments, if the speed of the MAC & MII (Speed X) is at an IEEE standard speed of 100 Mb/sec or any other rate generally supported in existing SoCs, the communications rate adaption device can run at any speed (Speed Y) that is slower than the MAC & MII speed (Speed X) if:
1) The communications rate adaption device contains buffer memory (e.g., First In First Out (FIFO) memories or equivalent in both the transmit and receive direction of at least 1 maximum Ethernet frame size); and
2) The communications rate adaption device supports a "stalling" mechanism back to the Ethernet MAC unit to stop the Ethernet MAC unit from sending the next frame until the communications rate adaption device is ready for it (because the physical media may be shared with other MACs and because the MDI 742 data rate may be slower than the MII 750 data rate).

Figure 8:
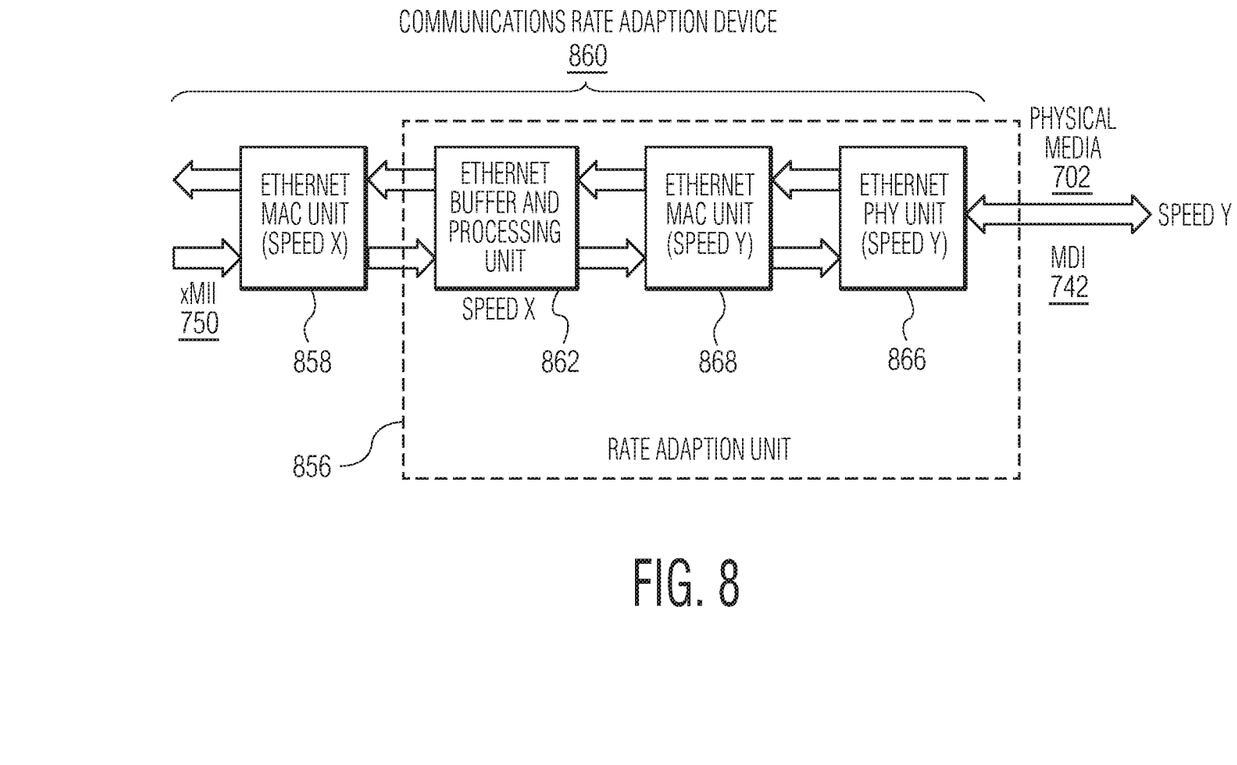
FIG. 8 depicts an embodiment of the communications rate adaption device depicted in FIG. 7.

FIG. 8 depicts a communications rate adaption device 860, which is an embodiment of the communications rate adaption device 760 depicted in FIG. 7. In the embodiment depicted in FIG. 8, the communications rate adaption device includes an Ethernet MAC unit 858 configured to perform media access control and a rate adaption unit 856 configured to adapt to transmit data to or from the Ethernet MAC unit 858 at a data communications rate. The rate adaption unit includes an Ethernet buffer and processing unit 862, a second Ethernet MAC unit 868, and an Ethernet PHY unit 866. The communications rate adaption device 860 depicted in FIG. 8 is an embodiment of the communications rate adaption device 760 depicted in FIG. 7. However, the communications rate adaption device depicted in FIG. 7 is not limited to the embodiments shown in FIG. 8.

In the embodiment depicted in FIG. 8, the Ethernet MAC unit 858 is connected to the SoC 710 (shown in FIG. 7) via the MII 750 to receive data from the Ethernet MAC unit 708 of the SoC or switch. The Ethernet MAC unit 858 operates at the same speed (speed X) as the Ethernet MAC unit 708 of the SoC or switch. For example, the Ethernet MAC unit 858 and the Ethernet MAC unit 708 of the SoC both operate at 100 Mb/s. The Ethernet MAC unit 858 is configured to transfer the date received from the SoC into the Ethernet buffer and processing unit 862, which includes one or more buffers (e.g., FIFOs or equivalent logics) to hold received Ethernet frames so that the frames' data can be rate adapted. The output of the Ethernet buffer and processing unit is at the speed (Speed Y), which is typically lower than speed X. The Ethernet MAC unit 868 is configured to re-frame buffered data into proper Ethernet frames for the Ethernet PHY unit 866. Data flowing in the reverse direction (i.e., from MDI to MII) may also rate adapted by the Ethernet buffer and processing unit.

In some embodiments, the communications rate adaption device 860 implements a "stalling" mechanism such that the SoC 710's transmit function is slowed down to the effective data rate at which one or more buffers within the Ethernet buffer and processing unit can be emptied on the physical media 702. The effective data rate is slower than Speed X because speed X is typically higher than speed Y (the MDI) and if speed X is equal to speed Y, the physical media may be shared with other device, e.g., in a multi-drop mode, which means the physical media (through the MDI) can be busy with other device's data. The communications rate adaption device can implement the stalling mechanism in different implementations.

In some embodiments, the communications rate adaption device 860 (e.g., the Ethernet buffer and processing unit 862 or the Ethernet MAC unit 868) is configured to use at least one signal of the MII 750 to inform the SoC's Ethernet MAC unit to stall data transmission through the MII. Examples of the signals that can be used for stalling include, without being limited to, Collision (COL) signal and Carrier Sense (CRS) signal. For example, if the SoC 710's Ethernet MAC unit is in half-duplex mode (e.g., IEEE standard 100 Mb/sec half-duplex mode), the MII interface contains signals that can be used to inform the SoC's Ethernet MAC unit 708 that the physical media 702 is busy with another device's data.

In some embodiments, the communications rate adaption device 860 (e.g., the Ethernet buffer and processing unit 862 or the Ethernet MAC unit 868) is configured to transmit an IEEE 802.3x Pause frame signal to inform the SoC 710's Ethernet MAC unit 708 to stall data transmission. For example, if the SoC's Ethernet MAC unit 708 is in full-duplex mode, the Ethernet MAC unit 708 may support IEEE 802.3x full-duplex flow control. The communications rate adaption device can send a Pause frame to inform the SoC's Ethernet MAC unit 708 to indicate that its buffer fills up and inform the SoC to stop sending data for a certain time duration.

In some embodiments, the communications rate adaption device 860 (e.g., the Ethernet buffer and processing unit 862 or the Ethernet MAC unit 868) is configured to stop transmitting a clock signal to the SoC 710's Ethernet MAC unit 708 to stall data transmission. For example, if the SoC's Ethernet MAC unit 708 does not support half-duplex and full-duplex flow control, the communications rate adaption device can stall the SoC's Ethernet MAC unit 708 by stopping transmitting a Tx Clock signal (transmit clock) to the SoC. The MII supplies two independent clock signals, which include a first clock signal that determines the SoC's transmit data rate and a second clock signal that determines the SoC's receive data rate, to the SoC's Ethernet MAC unit 708. In some embodiments, the communications rate adaption device is configured to stopping transmitting a Tx Clock signal to the SoC during an Ethernet interframe gap that occurs between Ethernet frames.

In some embodiments, the communications rate adaption device 860 (e.g., the Ethernet buffer and processing unit 862 or the Ethernet MAC unit 868) is configured to adapt data clock rate in differential Manchester encoding. For example, the PHY symbol encoding used for IEEE 802.3cg is differential Manchester encoding, which is an encoding where data's clock rate is embedded into data symbols used on the physical media. This approach supports near instantaneous locking of the receive clock from whomever is transmitting, which is intended in IEEE 802.3cg to support low cost Crystal clock reference (XTAL)'s in each node where the Part Per Million (PPM) can be +/−100. However, this also allows the recovery of the transmitter's clock if the data rate (speed) is at a faster rate, like 15, 20 or 25 Mb/sec, or some other speed. The communications rate adaption device can tune the effective data rate on the physical media 102 to the specific use case it is used in, and a corresponding PHY chip does not need to be re-designed for different media coding.

In the embodiments depicted in FIGS. 7 and 8, the communications rate adaption device 760 or 860 is external to the SoC 710. However, in some embodiments, the communications rate adaption device is at least partially integrated into the SoC 710. In these embodiments, compared to the communications rate adaption device 860 depicted in FIG. 8, a communications rate adaption device can be implemented with less components. In an embodiment, a communications rate adaption device is integrated into an SoC with an Ethernet MAC unit of speed, X. In this embodiment, the communications rate adaption device includes an Ethernet buffer and processing unit and an Ethernet MAC unit of speed, Y, while an Ethernet PHY unit of speed, Y, of an Ethernet PHY device communicates with the Ethernet MAC unit of speed, Y, through an MII. In another embodiment, a communications rate adaption device is implemented within an SoC with an Ethernet MAC unit of speed, X, and within an Ethernet PHY device with an Ethernet MAC unit of speed, Y. In this embodiment, the communications rate adaption device includes an Ethernet buffer and processing unit within the SoC and an Ethernet MAC unit of speed, Y, within the Ethernet PHY device. The Ethernet buffer and processing unit communicates with the Ethernet MAC unit of speed, Y, through an MII.

Figure 9:
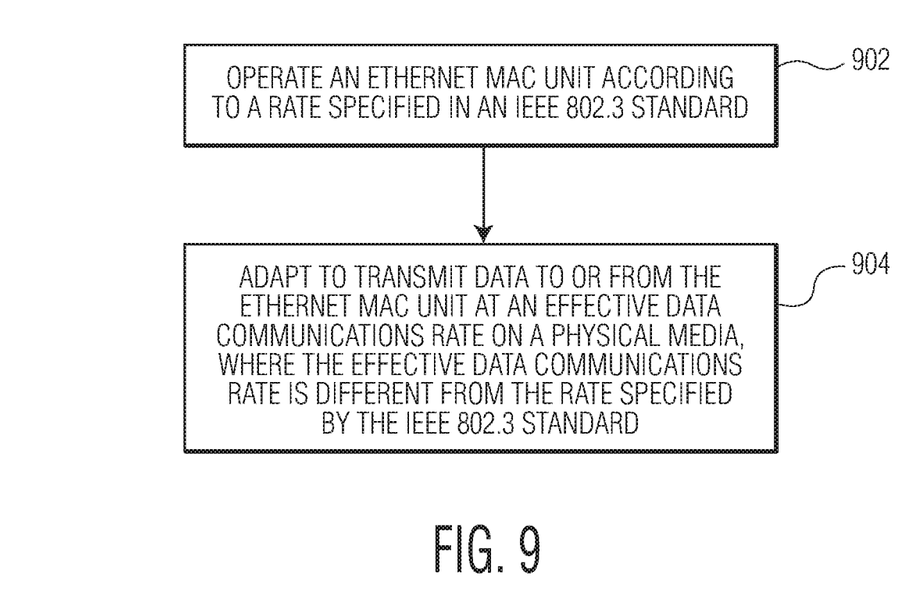
FIG. 9 is a process flow diagram of a method of communications.

FIG. 9 is a process flow diagram of a method of communications. According to the method, at block 902, an Ethernet media access control (MAC) unit is operated according to a rate specified in an IEEE 802.3 standard (e.g., IEEE 802.3 standards as of the end of 2019). At block 904, it is adapted to transmit data to or from the Ethernet MAC unit at an effective data communications rate on a physical media, where the effective data communications rate is different from the rate specified by the IEEE 802.3 standard.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of communications, the method comprising:
    operating an Ethernet media access control (MAC) unit according to a rate specified in an IEEE 802.3 standard; and
    adapting to transmit data to or from the Ethernet MAC unit at an effective data communications rate on a physical media, wherein the effective data communications rate is different from the rate specified by the IEEE 802.3 standard;
    wherein adapting to transmit the data to or from the Ethernet MAC unit at the effective data communications rate on the physical media further comprises stalling a transmission of the data to or from the Ethernet MAC unit;
    wherein stalling the transmission of the data to or from the Ethernet MAC unit comprises stopping transmitting a clock signal to the Ethernet MAC unit during an Ethernet interframe gap that occurs between Ethernet frames.

2. The method of claim 1, wherein the effective data communications rate is lower than the rate specified by the IEEE 802.3 standard.

3. The method of claim 2, where the rate specified by the IEEE 802.3 standard is 100 Megabits per second (Mb/s), and wherein the effective data communications rate is between 10 Mb/s and 100 Mb/s.

4. The method of claim 1, wherein adapting to transmit the data to or from the Ethernet MAC unit at the effective data communications rate on the physical media comprises buffering the data that is transmitted to or from the Ethernet MAC unit.

5. The method of claim 4, wherein adapting to transmit the data to or from the Ethernet MAC unit at the effective data communications rate on the physical media further comprises reframing the buffered data to a second data rate that is lower than rate specified in the IEEE 802.3 standard.

6. The method of claim 1, wherein stalling the transmission of the data to or from the Ethernet MAC unit comprises transmitting a stall signal of a media-independent interface (MII) to the Ethernet MAC unit.

7. The method of claim 6, wherein the stall signal of the MII comprises a Collision (COL) signal or a Carrier Sense (CRS) signal.

8. The method of claim 1, wherein stalling the transmission of the data to or from the Ethernet MAC unit comprises transmitting an IEEE 802.3x Pause frame signal to inform the Ethernet MAC unit to stop sending data for a fixed time duration.

9. The method of claim 1, wherein the data that is transmitted to or from the Ethernet MAC unit is encoded by differential Manchester encoding.

10. A communications rate adaption device, the communications rate adaption device comprising:
    an Ethernet media access control (MAC) unit operable according to a rate specified in an IEEE 802.3 standard; and
    a rate adaption unit configured to adapt to transmit data to or from the Ethernet MAC unit at an effective data communications rate on a physical media, wherein the effective data communications rate is different from the rate specified by the IEEE 802.3 standard;
    wherein the rate adaption unit is further configured to stall a transmission of the data to or from the Ethernet MAC unit, wherein stalling the transmission of the data to or from the Ethernet MAC unit comprises stopping transmitting a clock signal to the Ethernet MAC unit during an Ethernet interframe gap that occurs between Ethernet frames.

11. The communications rate adaption device of claim 10, wherein the effective data communications rate is lower than the rate specified by the IEEE 802.3 standard.

12. The communications rate adaption device of claim 11, where the rate specified by the IEEE 802.3 standard is 100 Megabits per second (Mb/s), and wherein the effective data communications rate is between 10 Mb/s and 100 Mb/s.

13. The communications rate adaption device of claim 10, wherein the rate adaption unit comprises a buffer configured to buffer the data that is transmitted to or from the Ethernet MAC unit.

14. The communications rate adaption device of claim 13, wherein the rate adaption unit is further configured to reframe the buffered data to a second data rate that is lower than rate specified in the IEEE 802.3 standard.

15. The communications rate adaption device of claim 10, wherein the rate adaption unit is further configured to transmit an IEEE 802.3x Pause frame signal to inform the Ethernet MAC unit to stop sending data for a fixed time duration.

16. A communications network comprising:
    a shared media;
    multiple Ethernet communications devices connected to the shared media, each of the Ethernet communications devices comprising:
        an Ethernet media access control (MAC) unit operable according to a rate specified in an IEEE 802.3 standard; and
        a rate adaption unit configured to adapt to transmit data to or from the Ethernet MAC unit at an effective data communications rate on a physical media, wherein the effective data communications rate is different from the rate specified by the IEEE 802.3 standard;
        wherein the rate adaption unit is further configured to stall a transmission of the data to or from the Ethernet MAC unit, wherein stalling the transmission of the data to or from the Ethernet MAC unit comprises stopping transmitting a clock signal to the Ethernet MAC unit during an Ethernet interframe gap that occurs between Ethernet frames.

* * * * *